United States Patent [19]
Pickett et al.

[11] Patent Number: 5,273,661
[45] Date of Patent: Dec. 28, 1993

[54] METHOD FOR PROCESSING AQUEOUS WASTES

[76] Inventors: John B. Pickett, 3922 Wood Valley Dr., Aiken, S.C. 29803; Hollis L. Martin, Rt. 1, Box 188KB, McCormick, S.C. 29835; Christine A. Langton, 455 Sumter St. SE., Aiken, S.C. 29801; Willie W. Harley, 110 Fairchild St., Batesburg, S.C. 29006

[21] Appl. No.: 839,540
[22] Filed: Feb. 21, 1992
[51] Int. Cl.$^5$ .............................................. C02F 1/62
[52] U.S. Cl. ................................. 210/710; 210/724; 210/726; 210/727; 210/732; 210/750; 210/751; 210/772; 210/776; 210/906; 210/912; 210/919
[58] Field of Search ............... 210/710, 724, 732, 750, 210/751, 772, 790, 906, 919, 912, 749, 726, 727; 252/631, 635, 628

[56] References Cited

U.S. PATENT DOCUMENTS

| | | | |
|---|---|---|---|
| 2,797,143 | 6/1957 | Arendale et al. | 210/724 |
| 3,013,978 | 12/1961 | Rosinski | 210/724 |
| 3,205,588 | 9/1965 | Oetjen et al. | 34/5 |
| 3,567,018 | 3/1971 | Moler | 210/67 |
| 3,705,648 | 12/1972 | Arvanitakis | 210/66 |
| 3,890,244 | 6/1975 | Carlin | 210/912 |
| 4,122,028 | 10/1978 | Iffland et al. | 252/301.1 |
| 4,269,706 | 5/1981 | Sondermann | 210/724 |
| 4,347,141 | 8/1982 | Rothberg | 210/912 |
| 4,350,620 | 9/1982 | Hartinger et al. | 252/628 |
| 4,363,757 | 12/1982 | Köster et al. | 252/628 |
| 4,377,508 | 3/1983 | Rothberg | 252/631 |
| 4,442,028 | 10/1984 | Wolf et al. | 252/628 |
| 4,575,427 | 3/1986 | Ysern de Arce | 210/751 |
| 4,582,637 | 4/1986 | Kirkham | 252/628 |
| 4,705,672 | 11/1987 | McCurdy et al. | 423/3 |
| 4,770,783 | 9/1988 | Gustavsson et al. | 210/638 |
| 4,800,042 | 1/1989 | Kurumada et al. | 252/628 |
| 4,804,498 | 2/1989 | Mizuno et al. | 210/712 |
| 4,952,339 | 8/1990 | Temus et al. | 252/632 |
| 4,956,157 | 9/1990 | Nasu | 210/912 |
| 4,961,862 | 10/1990 | Janecek | 210/778 |

Primary Examiner—Neil M. McCarthy
Attorney, Agent, or Firm—Brian R. Tumm; Harold M. Dixon; William R. Moser

[57] ABSTRACT

A method for treating waste water such as that from an industrial processing facility comprising the separation of the waste water into a dilute waste stream and a concentrated waste stream. The concentrated waste stream is treated chemically to enhance precipitation and then allowed to separate into a sludge and a supernate. The supernate is skimmed or filtered from the sludge and blended with the dilute waste stream to form a second dilute waste stream. The sludge remaining is mixed with cementitious material, rinsed to dissolve soluble components, then pressed to remove excess water and dissolved solids before being allowed to cure. The dilute waste stream is also chemically treated to decompose carbonate complexes and metal ions and then mixed with cationic polymer to cause the precipitated solids to flocculate. Filtration of the flocculant removes sufficient solids to allow the waste water to be discharged to the surface of a stream. The filtered material is added to the sludge of the concentrated waste stream. The method is also applicable to the treatment and removal of soluble uranium from aqueous streams, such that the treated stream may be used as a potable water supply.

17 Claims, 2 Drawing Sheets

METHOD FOR PROCESSING AQUEOUS WASTES

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to processing liquid wastes. In particular, the present invention relates to the precipitation, filtering, and solidifying of hazardous materials in aqueous waste streams from industrial process facilities.

2. Discussion of Background

Manufacturing and processing facilities generally produce aqueous waste streams. The waste streams may contain metal ions or particulate matter that cannot, in the concentrations generated, be discharged into a navigable stream or other body of water. Various techniques have become standard for treating these waste waters, such as filtration, precipitation, and dilution. Standard treatment techniques are effective up to a point. However, regulatory requirements for producing drinking water and for making water safe from toxic materials are becoming increasingly more stringent. Furthermore, in addition to treating waste waters as they are generated, some water sources have already been contaminated from past activities and must be treated to bring the water from those sources to current standards.

Removing contaminants from waste water effluents and contaminated bodies of water is an enormous task using currently available technology, one requiring considerable resources of equipment and money. There is a vital need for new, inexpensive waste water treatment techniques that can meet regulatory standards.

SUMMARY OF THE INVENTION

According to its major aspects and broadly stated, the present invention is a method for treatment of aqueous wastes that are separable into a dilute waste stream and a concentrated waste stream. The concentrated waste stream is treated chemically to enhance precipitation and then allowed to settle into a sludge and a supernate. The supernate is skimmed from the sludge and blended with the dilute waste stream to form a second dilute waste stream. The sludge remaining is mixed with cementitious material, rinsed to dissolve soluble components, then pressed to remove the excess water and dissolved solids before the cement is allowed to cure and encapsulate or stabilize the wastes.

The dilute waste stream is also treated chemically to decompose carbonate complexes and precipitate metal ions and then mixed with cationic polymer to cause the precipitated solids to flocculate. Filtration of the floccules removes sufficient solids to allow the waste water to be discharged to the surface of a stream. The filtered material is added to the sludge of the concentrated waste stream.

The addition of the supernate to the dilute waste stream is an important feature of the present invention. "supernate" will be used herein to include supernate, filtrate and filter cake wash. By separating the supernate and solidifying only the sludge, the total volume of the concentrated waste stream to be solidified and stabilized is significantly reduced. Furthermore, the supernate may contain phosphates that will help to precipitate metal ions in the dilute waste stream.

Rinsing the sludge is another important aspect of the present invention. Rinsing eliminates much of the soluble components of the sludge, particularly nitrates, which are believed to inhibit the curing of cementitious materials.

The use of cement as a filter aid is also an important feature of the present invention. Using cement in this way saves material costs since it serves the dual function of aiding filtration and solidifying, but it also eliminates material addition that would have otherwise contributed to the volume of material disposed.

Decomposing carbonates under acidic conditions before changing the pH to basic levels for metal ion precipitation is another very important feature of the present invention. Many metallic ions may form soluble carbonate complexes, which prevent the precipitation of these metal ions as stable phosphate or hydroxide compounds. Removing carbonates favors precipitation with phosphates. Adding phosphates to further encourage precipitation is also a feature of the present invention; excess phosphates can be removed by adding alum.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a schematic illustrating of an aqueous waste process according to a preferred embodiment of the present invention;

DETAILED DESCRIPTION OF A PREFERRED EMBODIMENT

Figure 2:
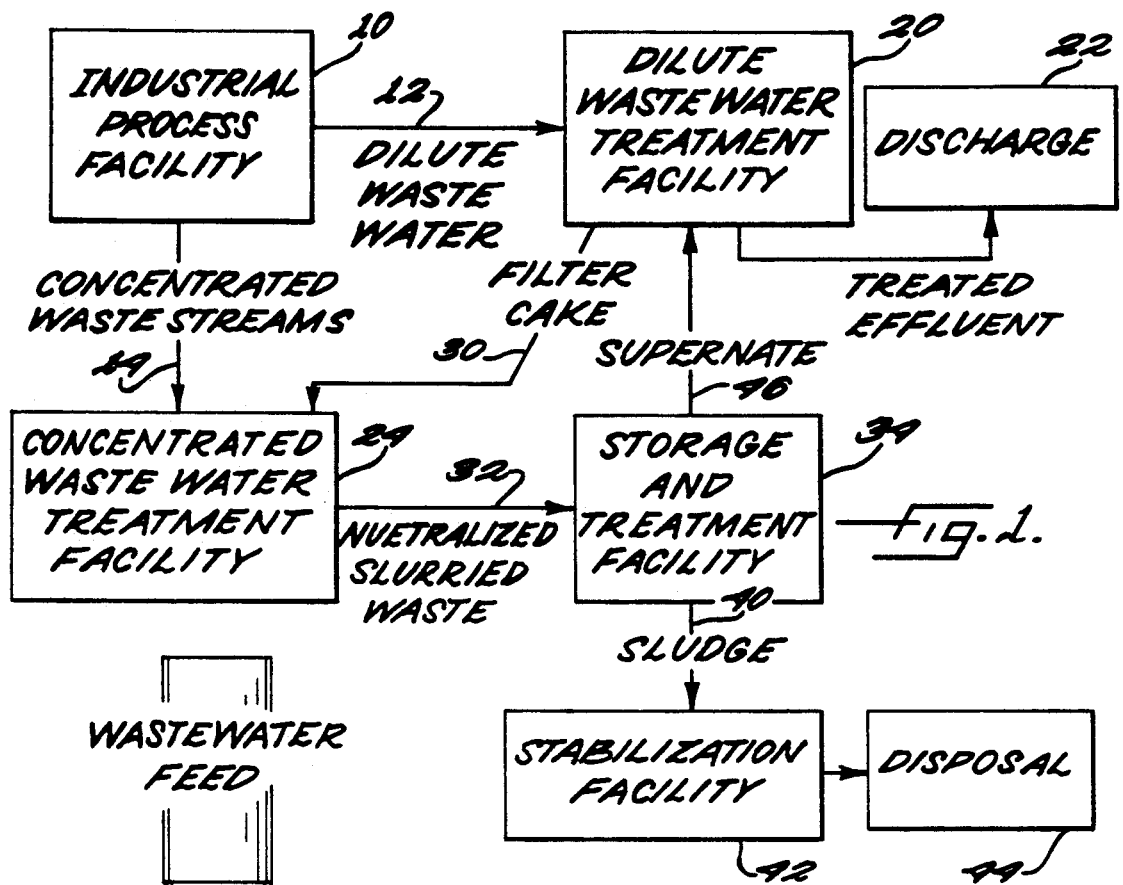
FIG. 2 is a schematic illustration of a stabilization facility according to a preferred embodiment of the present invention.

Waste waters issue through a process sewer coming from an industrial process facility. The sources of the process waste water include rinse water, quench water, laboratory sinks, floor sumps, and stack scrubbers. Waste water typically contains nitrates, metal hydroxides, metal oxides, and metal phosphates that are hazardous and/or radioactive. The goal of the present process is the removal of these. The hydroxides and phosphates are in the form of 1-5 micron flakes; the metal oxides are in the form of 0.5-2 micron cinders.

Referring now to FIG. 1, there is illustrated an industrial process facility 10 that produces two waste streams, a dilute waste water stream 12 and a concentrated waste stream 14. The cutoff concentrations of the various constituents between "dilute" and "concentrated" is somewhat arbitrary but is based largely on the capabilities of the downstream equipment and economic choices.

The dilute waste water stream is pumped to a dilute waste water treatment facility 20 where, as will be described more fully below, it will be blended with other dilute waste water streams, treated chemically, and filtered to a point where the effluent can be safely discharged into a stream 22 in full compliance with regulatory requirements. The concentrated waste stream 14 will be pumped to a concentrated waste water treatment facility 24 where it will also be treated to further concentrate solids before they can be stabilized and solidified in a form suitable for disposal and in compliance with regulatory requirements.

Concentrated waste water treatment facility 24 receives filtercake 30 from the processing of the dilute waste water in dilute waste water treatment facility 20. Filtercake 30 is combined with concentrated waste streams 14 to produce neutralized waste 32 that is slurried to a storage and treatment facility 34.

At storage and treatment facility 34, the waste is allowed to settle and separate into a solid sludge 40, that is sent to the stabilization facility 42 for solidification and stabilization and then to disposal 44, and to a supernate 46 which is returned to the dilute waste water treatment facility for blending with dilute waste water 12.

FIG. 2 illustrates schematically dilute waste water treatment facility 20 and its major components. Dilute waste water 12 from industrial process facility 10 is received in an equilization/treatment tank 50 along with dilute waste waters from other sources in the system as will be presently identified. Equilization/treatment tank 50 enables a blending of various waste waters and treatment to facilitate precipitation. In particular, in the case of two sources of waste waters, one having phosphates and one having nitrates present, the careful blending of the two eliminates the need to add additional phosphates, which tend to form stable precipitates with many metals, such as uranium, present in nitrate solution as ions.

In equilization tank 50, the pH is adjusted to approximately a value of three, adding acid as needed, to bubble off carbon dioxide. Alum is added to remove excess phosphates, the removal of which has been enhanced by the reduction in the dissolved carbonate concentration. Then the pH is adjusted again to a value between approximately 6 and approximately 9, preferably in the range of 8.0-8.5, so that phosphates present can precipitate the metal ions present to a stable form.

As appropriate for the ions present, either cationic or anionic polymers 52 are mixed with the waste water by a static mixer 54 to attract and bind ions for enhancing flocculation in a flocculation tank 56. The polymers are preferably highly charged and cationic for removal of metals such as uranium.

Figure 4:
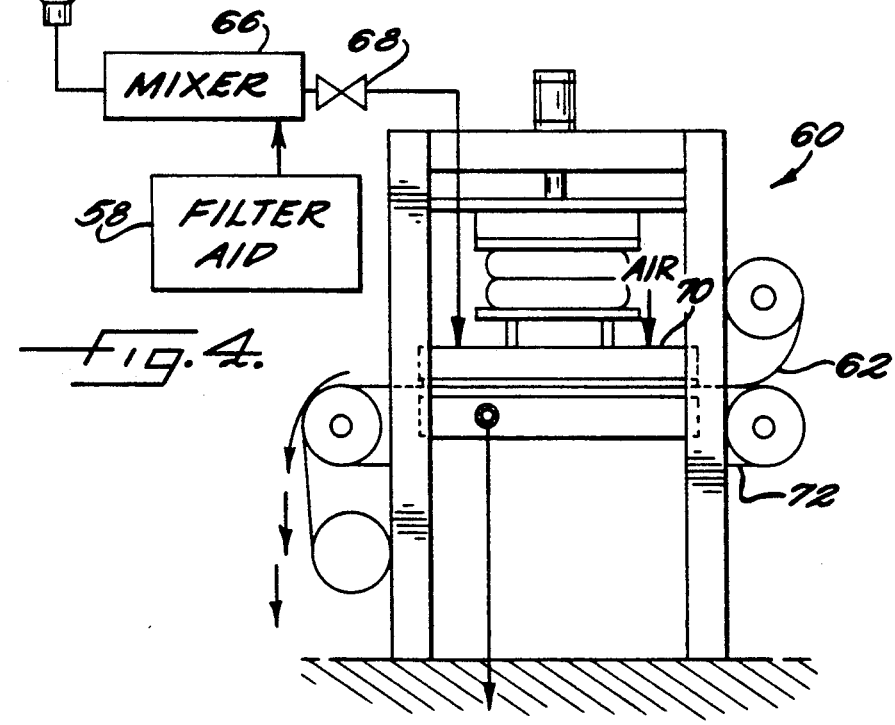
FIG. 4 is a side, partial cross-sectional view of a filter press according to a preferred embodiment of the present invention.
Figure 2:
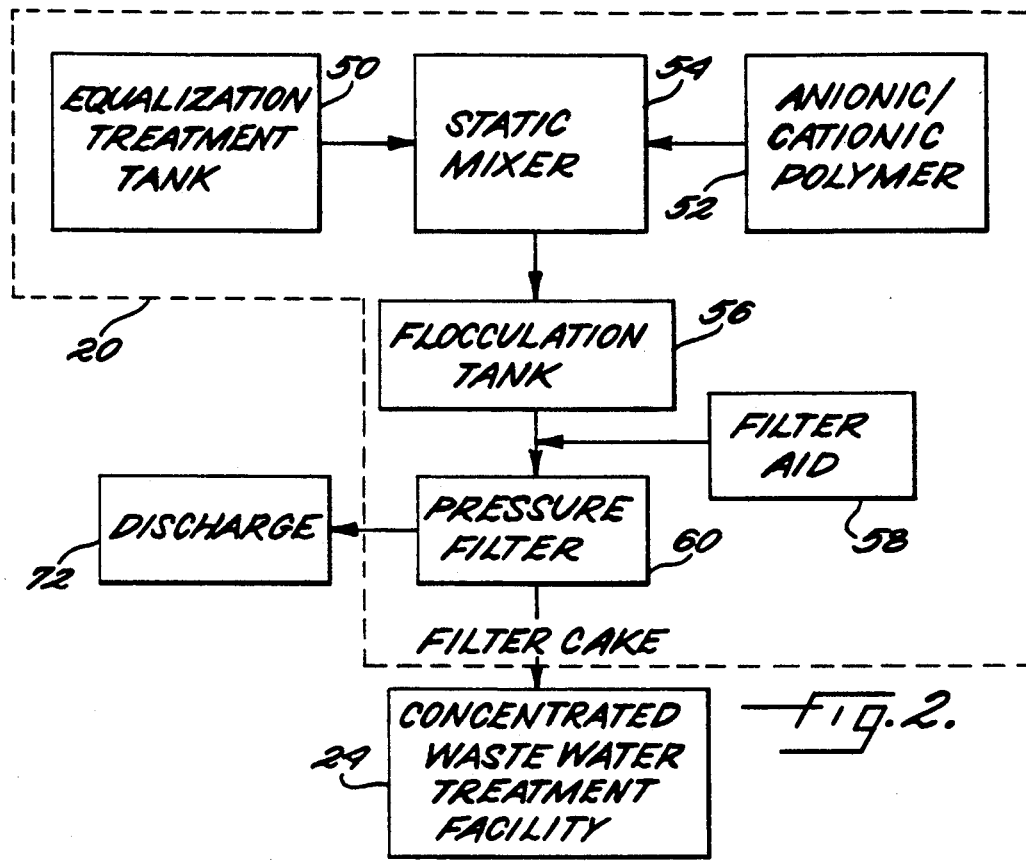

Downstream of the flocculation tank but before the waste water reaches the pressure filter, filter aid 56 may be added to enhance filtration of the floc. Filter aid 56 enhances filtration by creating pathways for the water through the floc. After the particles are flocculated, they are filtered with a high pressure, hydraulic filter 60 (See FIG. 4) using reusable polypropylene cloth and/or high density, disposable, polyethylene sub-micron medium 62. In particular, waste water 64 from flocculation tank 56 (FIG. 2) is mixed in mixer 66 with filter aid 58 and distributed over filter media 62 until the pressure from flow through filter cake reaches approximately 30 psig; then a waste water valve 68 is closed. Air is used to blow water from an upper platten 70 of filter press 60 and dry the cake. Then filter 60 is opened and the cake drawn away. New filter media and/or a clean section of belt 72 is moved into position and the process proceeds. Polymer 52 (FIG. 2), injected into an in-line, static waste water mixer upstream of flocculation tank 56 causes a reduction in cake solids and improves turbidity, cake release and media weight pickup. The filtered waters may be safely discharged to a surface stream 72.

Figure 3:
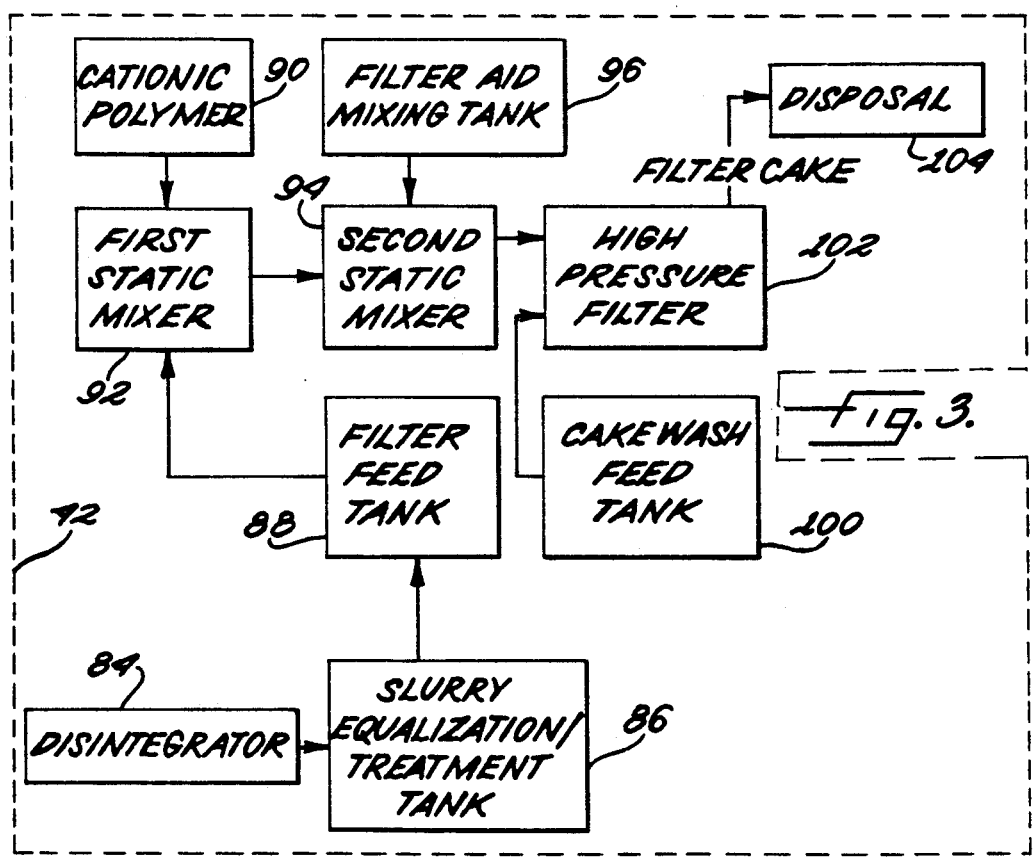
FIG. 3 is a schematic illustration of a concentrated waste water treatment facility according to a preferred embodiment of the present invention.

Filter cake 80 from pressure filter 60 is transferred to storage and treatment facility 42, either directly, or after reslurrying with water, as illustrated in FIG. 3. The pH is again adjusted, to a range above approximately 10 and preferably in the range 12 to 12.5. An alkaline solution this basic will precipitate metal ions such as uranium from the liquid phase, and the solid phase will settle. Normal settling results in a sludge that is a fraction of the total liquid volume. In the case of effluent from a nuclear production facility, the sludge includes sodium uranate, aluminum hydroxide, sodium nitrate, sodium and/or calcium zeolite, and silicon oxide. This pH control in the storage tanks causes the precipitation of many of the radioactive and toxic ions, most notably, sodium uranate, the concentration of which is reduced to 10-150 mg/L(ppm) in the supernate. The supernate is skimmed from the storage/settling tanks and returned to the equilization tanks of the Dilute Wastewater Treatment Facility. In the case of supernate containing phosphates and dilute waste water containing nitrates, the dilute waste water and the supernate are blended in a ratio of approximately 29:1 initially. By routine experimentation, the ratio can be altered to reduce still further the residual concentrations of metals in the final filtrate to a minimum. The transfer of the supernate back to the dilute waste water treatment facility where it can ultimately be filtered and the effluent safely discharged, results in a substantial reduction in the volume of solid waste to be processed and ultimately disposed for long time storage.

During treatment of the dilute waste water, with or without the supernate, the pH is controlled to provide improved uranium removal. The ratio of phosphate to uranium may also be controlled to provide the maximum uranium removal. The optimum ratio of phosphate to uranium for precipitation (at the pH range of 5-9) is a range of from one (1) to three (3) moles of phosphate to one (1) mole of uranium, with an optimum ratio of 2:1 (phosphate to uranium).

The soluble uranium is prescribed under these conditions as hydrogen uranyl phosphate ($HUO_2PO_4 \cdot 4H_2O$). It may also precipitate as an isomorphous compound, $H_2(UO_2)_2(PO_4)_2 \cdot 8H_2O$. These compounds, called hydrogen autenite, are very insoluble, and may be utilized to separate soluble uranium from an aqueous solution. If high concentrations of other cations are present, such as Na, K, Mg, Ca, or other alkalies, or alkaline earths, then the uranium may be precipitated as a sodium autenite, potassium autenite, etc.

The pH of the waste water is first reduced to 3.0, or lower, and maintained in an acidic condition for a period of time (2-4 hours). This pH level causes the metallic carbonate complexes to decompose, releasing carbon dioxide ($CO_2$) to the atmosphere. The pH of the solution is then increased to the optimim pH for the precipitation of all the heavy metals, or other constituents of concern. The precipitation is conducted before the solution can re-equilibrate with atmospheric $CO_2$, Preventing the re-dissolution of the uranyl phosphates, or other metallic phosphates, as soluble carbonates.

After decanting the supernate, the remaining sludge is passed through a disintegrator 84 to reduce the average partical size and the combined with other sludges in a slurry equalization tank 86. The equilized slurry is pumped to a filter feed tank 88 and held until ready for further processing.

The sludge is mixed with cement and cationic polymer 90 in a first static mixer 92, for polymer 90, and a second static mixer 94 for cement. The cement, preferably portland cement, serves two purposes. First, it acts as a filter aid 96; second, it solidifies the sludge to a stable waste form. Solidification with cement is well known; use of cement as a filter aid, however, is a particular feature of the present invention. Sludges having high concentrations of nitrates are difficult to solidify with cementitious materials, such as portland cement, pozzolans, flyash, blast furnace slag, and so on. Under regulatory leach testing guidelines, a sample of solidified product must be ground up and exposed to leaching solutions to determine its resistance to leaching (the Toxicity Characteristic Leaching Procedure [TCLP] standard Environmental Protection Agency test). Nitrates present in the sludge can reduce the ability of the solidified sludge to pass this type of test. Not wishing to be bound by theory, it is believed that, once the concentration of water in the sludge is reduced sufficiently by the setting cement, the nitrates begin to crystalize from the pore solutions, interfering with the formation of the crystalline cement phases.

However, in the present process, after mixing with cement, the sludge is rinsed with water from a cake wash feed tank 100 to remove soluble compounds such as nitrates, particularly sodium nitrate. Rinsing after combining with cement is another important feature of the present invention. It may be necessary to adjust the pH of the solution to approximately 12.5 to activate the cementitious material to be used. Then the rinsed sludge is squeezed in a high pressure diaphragm filter press 102 to remove the nitrates, soluble metals, and excess water. The squeezed sludge is in the form of sheets as it comes out of the press and will cure to a solid form that passes current leach tests. The wastes remaining after leaching are incorporated into the chemical structure of the reaction products of the cementitious grout and stabilized thereby in three ways: (1) the waste compounds are microencapsulated into the fine pore structure of the resulting solid waste form; (2) the metal ions precipitate in high pH pores in the least soluble chemical form; and (3) these contaminants are incorporated in the structure of the hydrated phases. The solidified sheets are then ready for land disposal 104.

For a newly designed facility, storage is unnecessary. The present process is equally effective in wastewater treatment and stabilization by equilization of wastewaters, adjustment of pH, and then feeding the slurry directly into filtration equipment.

It will be apparent to those skilled in the art that many changes and substitutions can be made to the preferred embodiment herein described without departing from the spirit and scope of the present invention as defined by the appended claims.

What is claimed is:

1. A method for treatment of aqueous wastes in the from of a first waste stream and a second waste stream, said first waste stream having metallic carbonate complexes, said method comprising the steps of:

separating said second waste stream into supernate and sludge by removing solids from said second waste stream;

blending said supernate with said first waste stream to form a third waste stream;

reducing the pH of said third waste stream to decompose said metallic carbonate complexes into metallic ions and carbon dioxide gas;

raising the pH of said third waste stream before atmospheric carbon dioxide re-equilibrates therewith; and adding a precipitating agent to said third waste stream to precipitate said metallic ions.

2. The method as recited in claim 1, further comprising the step of rinsing said sludge with water to remove soluble compounds from said sludge.

3. The method as recited in claim 1, further comprising the steps of:

rinsing said sludge with water to remove soluble compounds from said sludge; and mixing cementitious material with said rinsed sludge to solidify said rinsed sludge.

4. The method as recited in claim 1, further comprising the steps of:

mixing cementitious material with said sludge to form a mixture;

rinsing said mixture with water to remove soluble compounds from said sludge; and removing excess water and soluble compounds from said mixture.

5. A method for treatment of aqueous wastes containing nitrates, metal hydroxides, metal oxides, metallic carbonate complexes and metal phosphates, said aqueous wastes including a first waste stream and a second waste stream, said method comprising the steps of:

separating said second waste stream into supernate and sludge by removing solids from said second waste stream;

blending said supernate with said first waste stream to form a third waste stream;

reducing the pH of said third waste stream to decompose said metallic carbonate complexes into metallic ions and carbon dioxide gas;

raising the pH of said third waste stream before atmospheric carbon dioxide re-equilibrates therewith and adding a precipitating agent to said third waste stream to precipitate said metallic ions;

rinsing said sludge with water to remove any of said nitrates, metal hydroxides, metal oxides, and metal phosphates which are dissolved in an aqueous phase of said sludge; and solidifying said rinsed sludge.

6. The method as recited in claim 5, wherein before said sludge is solidified, said method further comprises the steps of:

mixing cementitious material with said rinsed sludge to form a mixture; and pressing said mixture to remove excess water and soluble compounds.

7. The method as recited in claim 5, wherein before said sludge is rinsed, said method further comprises the steps of:

mixing cementitious material with said sludge; and pressing said sludge and cementitious material after rinsing to remove excess water and soluble compounds.

8. The method as recited in claim 5, further comprising the steps of:

raising the pH of said second waste stream to at least approximately 12 to precipitate metal ions from said supernate;

skimming said supernate from said second waste stream; and blending said skimmed supernate with said first waste stream.

9. The method as recited in claim 5, further comprising the steps of:
   raising the pH of said second waste stream to at least approximately 12 to precipitate metal ions from said supernate;
   skimming said supernate from said second waste stream; and
   blending said skimmed supernate with said first waste stream to form said third waste stream whereby said supernate contains sufficient phosphates to precipitate metal ions in said third waste stream.

10. A method for treatment of aqueous wastes containing metallic carbonate complexes, said method comprising the steps of:
    reducing the pH of said aqueous wastes to decompose said metallic carbonate complexes into metallic ions and carbon dioxide gas;
    raising the pH of said waste stream before atmospheric carbon dioxide re-equilibrates therewith and adding a precipitating agent to said waste stream to precipitate said metallic ions.

11. The method as recited in claim 10, wherein said pH is reduced to a value hot higher than approximately three for at least approximately two hours to allow carbon dioxide to be released to the atmosphere from the aqueous waste stream.

12. The method as recited in claim 10, further comprising the step of adding phosphates to form precipitates with said metallic ions.

13. The method as recited in claim 10, further comprising the step of adding alum after precipitating said metallic ions to remove excess phosphates.

14. The method as recited in claim 10, further comprising the step of filtering said precipitates from aid aqueous waste.

15. The method as recited in claim 10, further comprising the steps of:
    adding cationic polymer to said aqueous waste;
    allowing said aqueous waste and cationic polymer to form floccules;
    filtering said floccules.

16. The method as recited in claim 1, wherein said pH is raised after at least approximately two hours but before re-equilibration of atmospheric carbon dioxide and said method further comprises the step of adding phosphates to precipitate said metallic ions present in third waste stream.

17. The method as recited in claim 1, wherein said pH is raised to a range between at least approximately six and approximately nine and said method further comprises the step of adding alum to remove phosphates in said first waste stream.

* * * * *